US008370056B2

(12) United States Patent
Trombley et al.

(10) Patent No.: US 8,370,056 B2
(45) Date of Patent: Feb. 5, 2013

(54) FALSE EVENT SUPPRESSION FOR COLLISION AVOIDANCE SYSTEMS

(75) Inventors: Roger Arnold Trombley, Ann Arbor, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 593 days.

(21) Appl. No.: 12/539,709

(22) Filed: Aug. 12, 2009

(65) Prior Publication Data

US 2011/0040481 A1 Feb. 17, 2011

(51) Int. Cl.
*G06F 17/10* (2006.01)

(52) U.S. Cl. ........... 701/301; 701/23; 701/25; 701/30.7; 701/30.8; 701/31.1; 701/33.4; 701/45; 701/96; 701/408; 701/430; 340/435; 340/436; 340/903; 340/988; 340/955.14; 180/167; 180/168; 180/271; 180/274

(58) Field of Classification Search .................. 701/301, 701/45, 96, 23, 25, 30.8, 30.7, 31.1, 33.4, 701/408, 540; 340/995.14, 436, 903, 435, 340/883, 988; 180/167, 274, 168, 271
See application file for complete search history.

(56) References Cited

U.S. PATENT DOCUMENTS

| | | | | |
|---|---|---|---|---|
| 6,853,919 | B2 * | 2/2005 | Kellum | 701/301 |
| 7,076,366 | B2 * | 7/2006 | Simon et al. | 701/301 |
| 2004/0153244 | A1 | 8/2004 | Kellum | |
| 2005/0149251 | A1 | 7/2005 | Donath et al. | |
| 2006/0106538 | A1 | 5/2006 | Browne et al. | |
| 2008/0136251 | A1 * | 6/2008 | Lee | 303/113.2 |
| 2008/0189039 | A1 * | 8/2008 | Sadekar et al. | 701/301 |
| 2011/0040481 | A1 * | 2/2011 | Trombley et al. | 701/301 |

* cited by examiner

*Primary Examiner* — Redhwan k Mawari
(74) *Attorney, Agent, or Firm* — Frank A. MacKenzie; Brooks Kushman P.C.

(57) ABSTRACT

A collision warning apparatus includes sensors, output devices, memory locations, a GPS device, and a processor. The processor may receive information from the sensors. The processor may also process the information to identify a detected object as a present potential collision object. The processor may compare present GPS coordinates of the vehicle with stored vehicle GPS coordinates saved in memory, to determine whether or not the present GPS coordinates correspond to stored vehicle GPS coordinates associated with a previously identified potential collision object. If the present GPS coordinates correspond to stored vehicle GPS coordinates associated with a previously identified potential collision object, the processor is operable to suppress a potential collision warning.

17 Claims, 4 Drawing Sheets

FALSE EVENT SUPPRESSION FOR COLLISION AVOIDANCE SYSTEMS

BACKGROUND

1. Technical Field

The illustrative embodiments generally relate to methods and one or more apparatuses for false event suppression for collision avoidance systems.

2. Background Art

Many automobiles now on the road have one or more sensors provided thereto that together help create a collision warning system (CWS). These sensors may include, but are not limited to, radar, cameras, and/or lidar.

As a vehicle approaches an object which could potentially cause a collision, the sensors begin receiving information about the relationship of the vehicle's position to the object. For example, if a tree were near a bend in the road, as the vehicle approached the bend the sensors may determine that the tree is directly ahead of the vehicle. But, as the vehicle got ever closer, the relationship between the vehicle's heading and the location of the tree would change as the car turned. Accordingly, the system may not issue a warning that the driver might impact the tree, unless the relationship is not changing quickly enough to avoid the tree based on the vehicle's speed (i.e., a slide off the turn into the tree is possible or likely).

Map data can further augment CWSs in vehicles. For example, in the above instance, if the vehicle had map and/or GPS data also available to it, it could determine that a turn prior to the detected location of the tree would be likely (without having to "guess" based on changing sensor data). Again, it may then only issue a warning if the vehicle is traveling at an excessive enough speed that a collision is possible or imminent.

It may be the case, however, that certain objects repeatedly cause false positives because, for example, the path of the car does not avoid these objects. One instance of such an object would be a metal plate in the road. The size and shape of the plate could be different enough from a road surface to initiate a collision alert, although driving over the plate does not actually cause an accident.

Other, similar false positives can also occur. It is useful to reduce the instances of false positives if possible, because alarms that are unnecessary can be distracting to the driver. Existing CWS systems often rely on repeated testing and refining of collision detection algorithms and sensing systems to attempt to more accurately define collision events.

SUMMARY

In one illustrative embodiment, a collision warning apparatus includes one or more sensors to detect one or more objects, one or more output devices operable to output a warning to a driver, one or more persistent memory locations to store one or more sets of vehicle GPS coordinates associated with previously identified potential collision objects, a GPS device operable to determine present GPS coordinates of a vehicle, and a processor in communication with the sensors, the output devices, the GPS device and the persistent memory locations.

In this illustrative embodiment, the processor may receive information from the one or more sensors. The processor may also process the information to identify a detected object as a present potential collision object.

Further, in this exemplary embodiment, the processor may compare present GPS coordinates of the vehicle with stored vehicle GPS coordinates saved in persistent memory, to determine whether or not the present GPS coordinates correspond to stored vehicle GPS coordinates associated with a previously identified potential collision object. If the present GPS coordinates correspond to stored vehicle GPS coordinates associated with a previously identified potential collision object, the processor is operable to suppress a potential collision warning.

In a second illustrative embodiment, a warning suppression method includes receiving information from one or more vehicle sensors. This exemplary method further includes processing the information to identify a detected object as a present potential collision object and determining present GPS coordinates of a vehicle.

The exemplary method also includes comparing present GPS coordinates of the vehicle with stored vehicle GPS coordinates saved in a memory, to determine whether or not the present GPS coordinates correspond to stored vehicle GPS coordinates that are associated with a previously identified potential collision object. If the present GPS coordinates correspond to stored vehicle GPS coordinates associated with a previously identified potential collision object, the method includes suppressing a potential collision warning.

In yet another illustrative embodiment, a computer readable storage medium, storing machine readable instructions, wherein the instructions, when executed by a microprocessor in a vehicle-based computing system, causes the system to perform the steps described above.

These figures are not exclusive representations of the systems and processes that may be implemented to carry out the inventions recited in the appended claims. Those of skill in the art will recognize that the illustrated system and process embodiments may be modified or otherwise adapted to meet a claimed implementation of the present invention, or equivalents thereof.

DETAILED DESCRIPTION

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
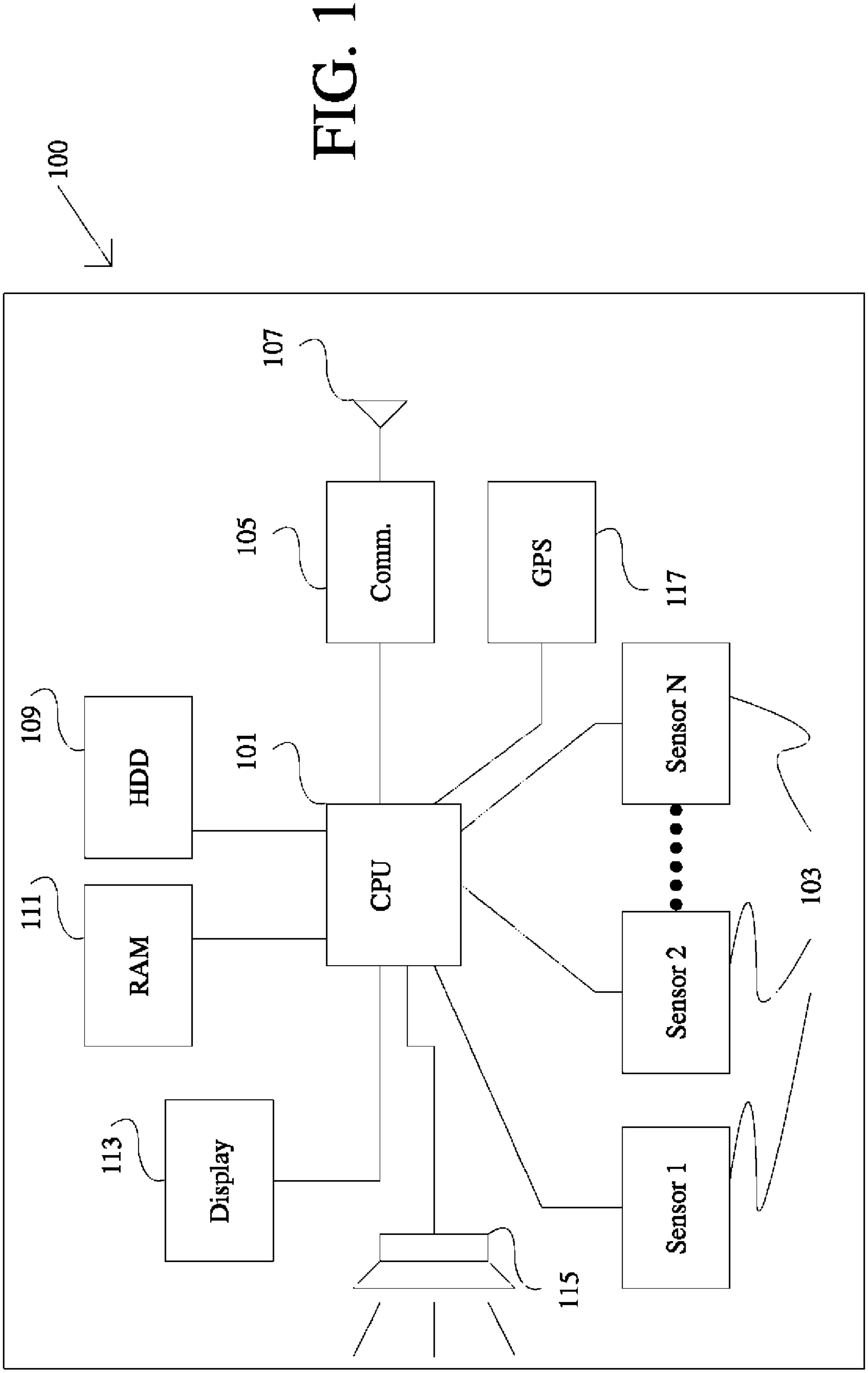
FIG. 1 shows an exemplary illustrative collision warning system provided to an automobile.

FIG. 1 shows an exemplary illustrative collision warning system (CWS) 100 that can be provided to a vehicle. In this illustrative embodiment, the CWS includes a microprocessor 101 that is operable to process instructions to and from various aspects of the CWS. This microprocessor could be a dedicated processor or the CWS could share a processor with other vehicle-based systems.

The CWS may also be provided with one or more vehicle-based sensors 103. These sensors can include, but are not limited to, radar, laser systems such as lidar, cameras, etc. For example, a camera or radar system can detect the presence of an obstacle within a projected possible path of a vehicle. As the vehicle approaches the obstacle, additional information about the positioning, size, etc of the obstacle can be gathered by vehicle sensors. If the vehicle's current heading and speed makes a collision with the object likely or possible, a warning can be given to the driver through a visual 113 or audio 115 system in communication with the microprocessor.

In this illustrative embodiment, the system also has one or more persistent memory 109 locations provided thereto and one or more non-persistent memory locations 111 provided thereto.

The system may store a record of detected objects in the persistent memory 109, or it may store a record of "false positives," or any other useful information. In another illustrative embodiment, the system has a communication connection 105 provided with an antenna 107 or other means of reaching a remote network or server. If the system can communicate with a remote network or server, the system may broadcast information for storage at a remote location and retrieve remote information for processing (or retrieve already-processed information).

For example, if a plurality of vehicles are provided with CWSs, and each vehicle is uploading information about detected objects, false positives, etc. to a central server, then a better overall picture of a given location can be assembled more rapidly and possibly more accurately as well. Of course, local storage and processing of detected objects is also possible and works suitably as well.

In addition, in this illustrative embodiment, the vehicle is provided with access to a GPS signal 117. This signal can be used to record the location of a vehicle when an object is detected. It can also be used in combination with stored map data to determine a vehicle's position on a particular road (possibly also vehicle heading) as a detected obstacle is approached.

Figure 2:
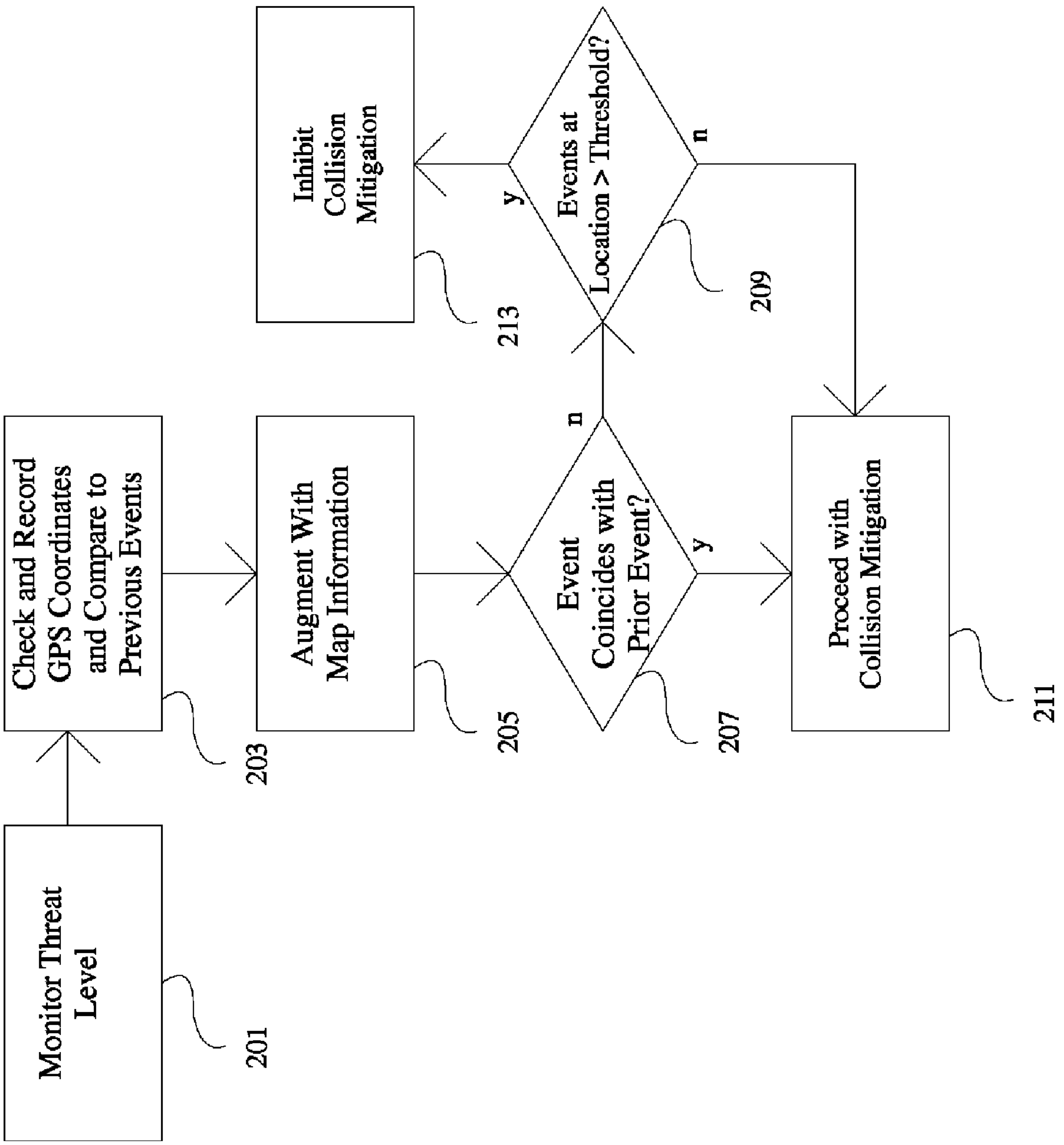
FIG. 2 shows an exemplary illustrative process for determining if a collision event warning should be inhibited.

FIG. 2 shows an exemplary illustrative process for determining if a collision warning should be inhibited. This process can be performed, for example, by a local microprocessor, by a remote microprocessor, etc.

In this illustrative embodiment, a collision warning system (CWS) can monitor a threat level 201. The system can determine if a detected object is likely to be struck by the vehicle. This determination can be based on a variety of factors, and known collision warning system methods and apparatuses can be used.

If a potential collision object is identified by the CWS, the system can query the navigation system to receive the current coordinate location of the vehicle at the time of the event detection/determination 203.

This information can then be compared to stored vehicle coordinates corresponding to previously identified objects. These coordinates could be stored on a local persistent memory or at a remote location.

The comparison can help the system determine if a potential present collision event is occurring at the same location as a previous event. The chances of multiple potential collision events at the exact same location are incredibly low. If a plurality of potential collision events continue to occur at the same vehicle location, it is likely that a false positive is occurring at this point.

When performing the check against previous events, allowances can be made for known error and drift of a GPS system, such that the present GPS location may only need to be within a threshold of a stored GPS location to signal a correspondence between the two.

If a vehicle has GPS only, but no digital map data available, a latitude/longitude flag can be recorded showing the vehicle location where a repeated potential collision event had been logged. In order to determine that the vehicle is in the same position (so as not to disable a real potential collision event warning), it may be useful to use a GPS "breadcrumb" trail.

Figure 3:
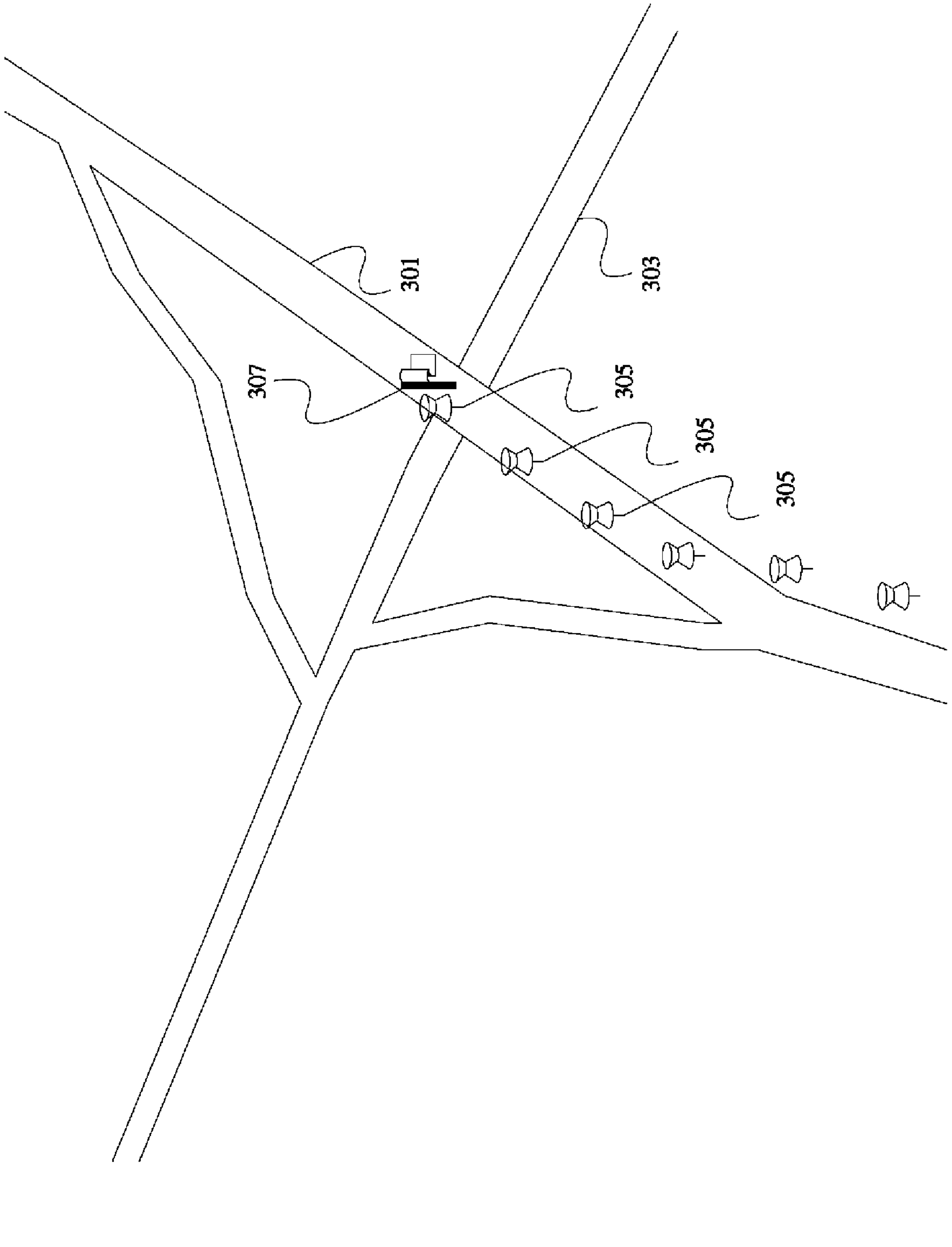
FIG. 3 shows an exemplary illustrative overlay of GPS breadcrumbs on a digital map.

A series of GPS coordinates leading up to the event may be recorded. A vehicle heading may also be used. This information can help in an instance where, for example, a road has an overpass and an underpass. If there is a false collision event location on an overpass, it would also not be advisable to disable the collision event warnings (or other collision mitigation events, such as brake discharge and other intervention events) for the underpass, even though a location under the bridge will have the same GPS coordinates as a location on top of the bridge. Accordingly, heading information, etc., can be useful in determining whether the "same" coordinate as a previously recorded collision avoidance event has been reached (an example of this is shown in FIG. 3).

In another illustrative embodiment, map data is available. In this illustrative embodiment, the data from the map can be appended to a collision avoidance flag 205. For example, a road name, a road name and heading, etc. can be appended to the flag for future reference.

Once the potential collision object has been identified, the system checks to see if a previous event was recorded that has a location associated therewith that corresponds to the present vehicle location 207.

For example, each time a potential collision object is identified using vehicle sensor information, the system can read a GPS device to determine vehicle coordinates. These coordinates can then be compared to stored coordinates.

The stored coordinates can be in, for example, a database in vehicle memory. The coordinates can be associated with previously detected potential collision objects. A correspondence between the present vehicle GPS coordinates and the previously stored GPS coordinates means that it is likely that the same or a similar object was detected the last time the vehicle was at this location.

Heading, road names, and/or any other additional information are used to determine if the present collision avoidance event corresponds to another previously recorded event. For example, if the present coordinates are the same as stored coordinates, but the present heading is different from a stored heading, then it's likely that the identified collision object is not the same object as the one associated with the corresponding stored GPS coordinates.

Also, in this illustrative embodiment, an event threshold may be set. If the number of collision avoidance events for a given vehicle location is above the event threshold 209, the system may determine that the potential collision object is a false positive (e.g., has been detected too many times to be an actual danger).

If there are no corresponding GPS coordinates for a given vehicle location when an event is detected, and/or if there are not a sufficient number-of-detections at that vehicle location to pass the threshold, the system will proceed with a collision avoidance warning 211. For example, the system will alert the driver of a possible collision.

If there are a sufficient number-of-detections at a given location to exceed the threshold, then the system will suppress the collision avoidance warning. Further collision avoidance warnings (or other collision mitigation events, such as brake discharge and other intervention events) at that vehicle location will additionally be suppressed so as not to distract the driver.

Multiple potential collision objects at the same vehicle location with the same heading are rare, so suppression of these events should not result in actual suppression of true potential collision events. The repeated occurrence of the collision suppression event actually tends to be an indicator that a collision is actually not imminent. Objects such as bridge supports, traffic signs, trees, metal plates in the road, etc., can cause these false positives.

FIG. 3 shows an exemplary illustrative overlay of GPS breadcrumbs on a digital map.

In this illustrative example, two roads 301 and 303 intersect at location 307. Since the vehicle can be at location 307 when traveling on road 301 and on 303, it is useful to know when the vehicle is on each of the two roads.

Accordingly, in this example, the vehicle is on road 301. The CWS knows that the vehicle has been traveling on road 301 because the trail of previously recorded GPS coordinates 305 leading up to 307 indicates the heading of the vehicle.

Even if map information is not available to a CWS, this breadcrumb information can provide sufficient background for a CWS to determine if a vehicle is on the road 301 or road 303 (even thought the CWS doesn't know that those roads exist). Based on heading information stored and associated with previous collision avoidance events, the system can accurately determine if the present location of the vehicle corresponds to a previously recorded location, and, accordingly, if a detected object has been previously detected.

Additionally, if a vehicle is in communication with a remote database (through, for example, a wireless connection or other connection), false collision events can be logged. This information can be used to update other systems in other vehicles that are also connected to the remote database. Further, this database could flag "legitimate" collision events that may simply commonly occur at a certain location, and update vehicles with the instructions to provide a warning (or other appropriate action) despite the number of times an event occurs at a particular location.

Figure 4:
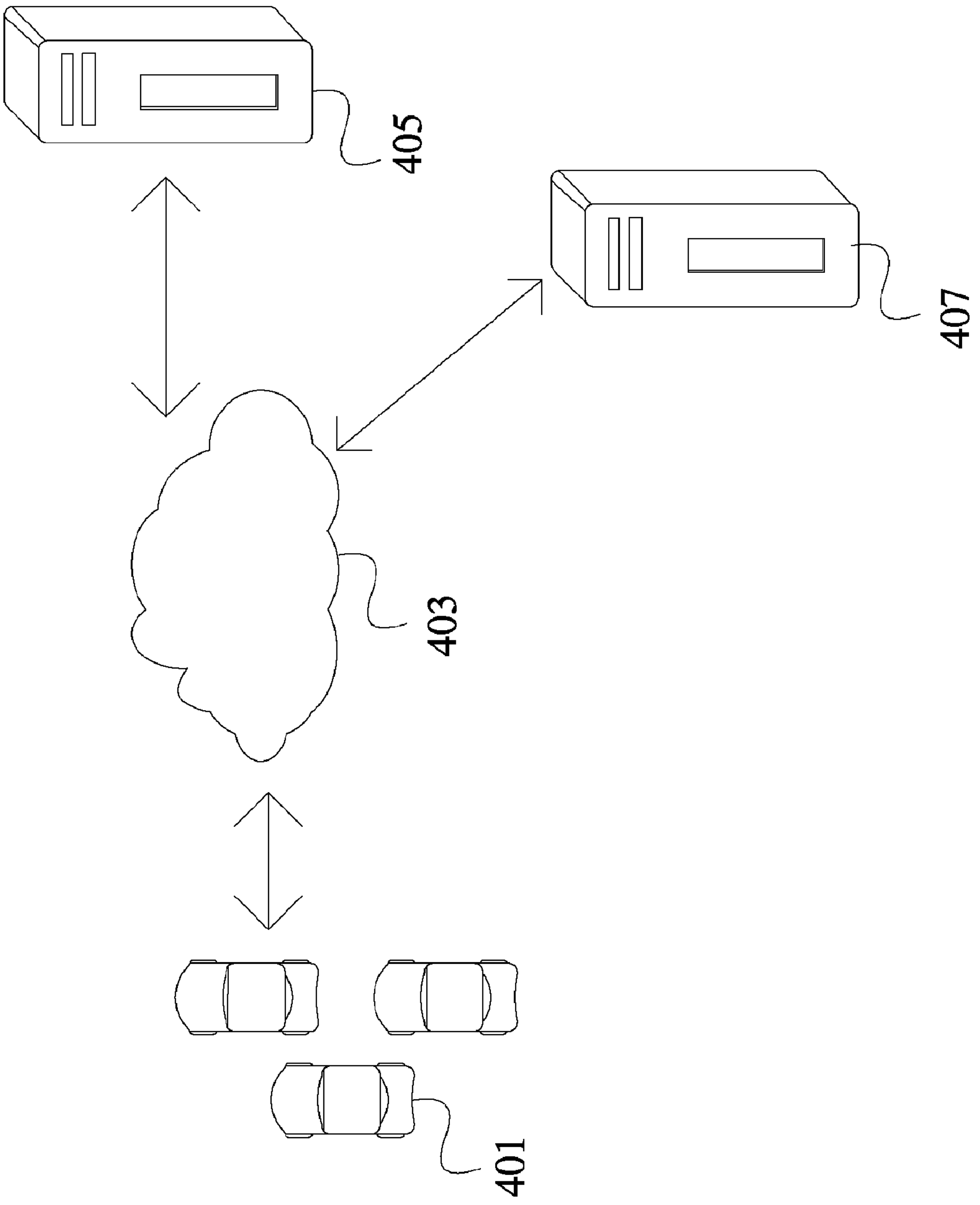
FIG. 4 shows an exemplary example of a database, operable to send out events to drivers and operable to be updated by vehicle systems remotely connected to the database.

FIG. 4 shows an exemplary example of such a database, operable to send out events to drivers and operable to be updated by vehicle systems remotely connected to the database.

In FIG. 4, a plurality of vehicles 401 are connectable to a remote database 405 through a network 403 (which could include cellular communication, such as, but not limited to, that used in the FORD SYNC system).

Further, the database may be connected to local municipalities 407 and be operable to send updates so the municipality may address the issue if it is addressable.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A collision warning apparatus comprising:

one or more sensors to detect one or more objects;

one or more output devices to output a warning to a driver;

one or more persistent memory locations to store one or more sets of vehicle GPS coordinates associated with previously identified potential collision objects;

a GPS device to determine present GPS coordinates of a vehicle;

and a processor in communication with the sensors, the output devices, the GPS device and the persistent memory locations, wherein the processor is configured to:

receive information from the one or more sensors and process the information to identify a detected object as a present potential collision object;

compare present GPS coordinates of the vehicle with stored vehicle GPS coordinates saved in persistent memory, to determine whether or not the present GPS coordinates correspond to stored vehicle GPS coordinates associated with a previously identified potential collision object; and if the present GPS coordinates correspond to stored vehicle GPS coordinates associated with a previously identified potential collision object, the processor is configured to suppress a potential collision warning; wherein the processor is further configured to access a stored number-of-detections associated with a previously detected potential collision object, stored in the persistent memory and indicative of the number of times a particular potential collision object has been detected at the associated stored vehicle GPS coordinates, and wherein the processor is configured to suppress a potential collision warning if the number-of-detections of a potential collision object, whose associated stored vehicle GPS coordinates correspond to the present GPS coordinates, exceeds a threshold.

2. The apparatus of claim 1, wherein the processor is further configured to determine if the present GPS coordinates are within a threshold range of stored vehicle GPS coordinates associated with a previously detected potential collision object.

3. The apparatus of claim 1, wherein the processor is configured to receive and store map data from the GPS device, and wherein the processor is further configured to determine, when a potential collision object is identified, on which of two or more intersecting roads a vehicle is traveling.

4. The apparatus of claim 3, wherein the determination as to on which of two or more interesting roads a vehicle is traveling is based at least in part on vehicle heading information obtainable by the processor.

5. The apparatus of claim 1, wherein the processor is configured to store, in the persistent memory or in non-persistent memory, a plurality of previous GPS coordinates in conjunction with the present GPS coordinates.

6. The apparatus of claim 1, wherein the processor is configured to store, in the persistent memory or in non-persistent memory, vehicle heading information in conjunction with the present GPS coordinates.

7. The apparatus of claim 1, wherein, if the present GPS coordinate do not correspond to stored vehicle GPS coordinates associated with a previously detected collision object, the processor is configured to proceed with a collision avoidance event.

8. The apparatus of claim 1, wherein at least one of the sensors is a proximity sensor.

9. The apparatus of claim 1, wherein at least one of the sensors is a camera.

10. The apparatus of claim 1, wherein the processor is configured to store the identified object as a previously detected collision object and to store and associate the present GPS coordinates with the object in the persistent memory.

11. A warning suppression method comprising:

receiving information from one or more vehicle sensors;

processing the information to identify a detected object as a present potential collision object;

determining present GPS coordinates of a vehicle;

comparing in a vehicle based computing system, present GPS coordinates of the vehicle with stored vehicle GPS coordinates saved in a memory, to determine whether or not the present GPS coordinates correspond to stored vehicle GPS coordinates that are associated with a previously identified potential collision object; and if the present GPS coordinates correspond to stored vehicle GPS coordinates associated with a previously identified potential collision object, suppressing a potential collision warning; accessing a stored number-of-detections associated with a previously detected potential collision object, stored in the memory and indicative of the number of times a particular potential collision object has been detected at the associated stored vehicle GPS coordinates, and suppressing a potential collision warning if the number-of-detections of a potential collision object, whose associated stored vehicle GPS coordinates correspond to the present GPS coordinates, exceeds a threshold.

12. The method of claim 11, further including:

receiving and storing map data from a GPS device; and determining, when a potential collision object is identified, on which of two or more intersecting roads a vehicle is traveling.

13. The method of claim 11, wherein the determining as to on which of two or more interesting roads a vehicle is traveling is based at least in part on vehicle heading information.

14. The method of claim 11, further including storing, in the memory, a plurality of previous GPS coordinates in conjunction with the present GPS coordinates.

15. The method of claim 11, further including storing, in memory, heading information in conjunction with the present GPS coordinates.

16. The method of claim 11, further including proceeding with a collision avoidance event, if the present GPS coordinate do not correspond to stored vehicle GPS coordinates associated with a previously detected collision object.

17. The method of claim 11, wherein the warning further comprises a brake discharge.

* * * * *